United States Patent [19]

Danielson et al.

[11] 4,221,691

[45] Sep. 9, 1980

[54] METHOD OF HYDROLYZING CHLOROSILANES

[75] Inventors: Jack B. Danielson; Donald N. Ingebrigtson, both of Midland, Mich.

[73] Assignee: Dow Corning Corporation, Midland, Mich.

[21] Appl. No.: 12,684

[22] Filed: Feb. 16, 1979

[51] Int. Cl.$^2$ ............................................... C08K 5/01
[52] U.S. Cl. .............................. 260/33.6 SB; 528/10; 528/12
[58] Field of Search ................... 260/33.6 SB; 528/10, 528/12

[56] References Cited

U.S. PATENT DOCUMENTS

| | | | |
|---|---|---|---|
| 2,398,672 | 4/1946 | Sauer | 528/10 |
| 2,470,497 | 5/1949 | Lamoreaux | 528/10 |
| 3,090,765 | 5/1963 | Nitzsche et al. | 260/37 SB |

FOREIGN PATENT DOCUMENTS 1173022 12/1969 United Kingdom .

*Primary Examiner*—Melvyn I. Marquis
*Attorney, Agent, or Firm*—James E. Bittell

[57] ABSTRACT

A method of hydrolyzing polyfunctional chlorosilicon compositions is described which produces more uniform, non-sticky gels which are more easily handleable. The method involves adding 1 to 25 weight percent of a hydrocarbon oil to the chlorosilicon composition prior to the hydrolysis in an aqueous medium.

7 Claims, No Drawings

METHOD OF HYDROLYZING CHLOROSILANES

BACKGROUND OF THE INVENTION

1. Field of the Invention

This invention relates to a method of hydrolyzing chlorosilicon compounds. More specifically this invention relates to a method of hydrolyzing polyfunctional chlorosilicon compounds to obtain gels that are non-sticky and easily handleable.

2. Description of the Prior Art

A wide variety of commercial silicone polymers are produced by the hydrolysis of a few basic organochlorosilanes. These important organochlorosilane monomers are produced by processes that also yield minor amounts of by-products. For example, methylchlorosilanes are obtained from the reaction of methyl chloride with silicon by what is commonly called the "direct process" method. The by-product from this process is a mixture containing many polyfunctional chlorosilicon compounds and is essentially useless. The eventual disposition of these by-product chlorosilicon mixtures has become a significant problem as the production volume of silicone polymers has increased. Considerable expense and difficulty is presently encountered when this by-product is incinerated because of its high chloride content.

It is taught in Great Britain Pat. No. 1,173,022 that chloride contained in the direct process by-products can be removed by either of two methods: (1) introducing sodium bicarbonate into the by-product and removing the sodium chloride produced, or (2) alkoxylating the by-product with an appropriate alcohol to split off hydrogen chloride.

It is known from U.S. Pat. No. 3,090,765 that the hydrolysis of chlorosilanes having one or less organic radicals per silicon atom results in separation of gel from the water. This gel deposits on the walls of the hydrolysis vessel and on the stirring apparatus. It is difficult to remove from the reaction vessel and presents a serious handling problem.

Techniques which prevent gelling have been developed to control the hydrolysis of chorosilane mixtures averaging one or more organic radicals per silicon atom for the production of commercial polysiloxane resins. It is taught in U.S. Pat. No. 2,398,672 that improved polysiloxane resins may be obtained by dissolving the chlorosilanes in a hydrocarbon solvent and adding the solution to a two phase mixture of water and a partially soluble alcohol. Alternatively, U.S. Pat. No. 2,470,497 teaches the addition of chlorosilanes to a hydrolysis medium of water, hydrocarbon solvent and a glycol either type solvent. These processes are not economically attractive for the hydrolysis of polyfunctional chlorosilicon by-products because they require relatively large amounts of organic solvents.

It is an object of this invention to provide a method of hydrolyzing polyfunctional chlorosilicon compounds that produces a gel that is non-sticky and easily handleable. Another object of this invention is to provide a method whereby polyfunctional chlorosilicon compounds can be economically hydrolyzed to greatly reduce the chloride content prior to disposal. Still another object of this invention is to provide a method of hydrolyzing polyfunctional chlorosilicon compounds whereby hydrogen chloride may be recovered.

SUMMARY OF THE INVENTION

Applicants have discovered a method of hydrolyzing polyfunctional chlorosilicon compositions comprising (a) forming a solution of 1 to 25 percent by weight of a hydrocarbon oil with a viscosity of at least 2 centistokes at 25° C. and 75 to 99 percent by weight of polyfunctional chlorosilicon composition, (b) mixing the solution with an aqueous medium and (c) removing the hydrogen chloride and aqueous medium to obtain a non-sticky, easily handleable gel.

DESCRIPTION OF THE INVENTION

This invention is based on the discovery that the addition of a relatively small amount of a hydrocarbon oil to a polyfunctional chlorosilicon composition prior to hydrolysis significantly improves the handling characteristics of the siloxane gel that is obtained. In accordance with the present invention the term "polyfunctional" as applied to chlorosilicon compositions refers to compositions containing a major proportion of chlorosilicon compound with at least 3 chlorine radicals bonded to silicon per molecule. The polyfunctional chlorosilicon compounds include organic substituted and non-organic substituted silanes, disilanes, disiloxanes, silphenylenes and silalkylenes. Examples of polyfunctional silanes are tetrachlorosilane, trichlorosilane, alkyltrichlorosilanes such as methyltrichlorosilane, ethyltrichlorosilane, propyltrichlorosilane and butyltrichlorosilane. Examples of polyfunctional disilanes that may be employed are hexachlorodisilane, tetrachlorodisilane, 1,2,-dimethyltetrachlorodisilane and 1,1,2-trimethyltrichlorodisilane. Examples of polyfunctional chlorodisiloxanes include methylpentachlorodisiloxane, dimethyltetrachlorodisiloxane and hexachlorodisiloxane. Silalkylenes that may be employed include $CH_3Cl_2SiCH_2SiCH_3Cl_2$, $CH_3Cl_2SiCH_2CH_2SiCl_3$ and $Cl_3SiCH_2CH_2CH_2SiCl_3$. Silphenylenes such as

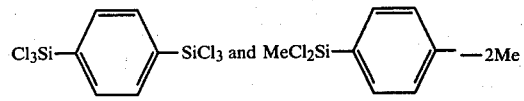

may be employed. The polyfunctional chlorosilicon composition may be a mixture of polyfunctional chlorosilicon compounds and minor amounts of other chlorosilicon compounds of lower chloride functionality.

In a preferred embodiment of the invention, the polyfunctional chlorosilicon composition comprises the by-product from the production of commercial organochlorosilane monomers. Suitable by-products include the high boiling residues from the direct process production of methylchlorosilanes, the Grignard synthesis of phenylmethylchlorosilanes, and the synthesis of phenylchlorosilanes via the reaction of benzene and trichlorosilane. These by-products are complex mixtures that have little value because of the difficulty of separating the many components. The major components of the by-products are polyfunctional chlorosilanes, chlorodisilanes, chlorodisiloxanes, chlorosilphenylenes and chlorosilalkylenes. The by-products may contain up to 40 percent by volume of suspended silicon metal fines. In addition the by-products contain minor amounts of chlorosilicon compounds of lower chloride functionality and may contain up to about 20% by weight of non-silicon containing hydrocarbon products. For example toluene, benzene, ethylbenzene, ethyltoluene, 2-methylhexane, and 3-methylhexane have been identified in the byproduct from the direct process production of methylchlorosilanes.

Prior to hydrolysis of the polyfunctional chlorosilicon composition a hydrocarbon oil is dissolved in the composition. Improved gel characteristics are obtained when the oil has a viscosity of at least 2 centistokes at 25° C. Any hydrocarbon oil of sufficient viscosity can be employed including fuel oils, diesel oils and lubricating oils. The greatest improvements are observed with higher viscosity oils so that it is preferred to employ an oil with a viscosity of at least 40 centistokes at 25° C. The amount of oil added to the chlorosilicon composition in accordance with the present invention is 1 to 25 percent by weight based on the combined weight of chlorosilicon composition and oil. When less than 1 percent oil is employed in the chlorosilicon composition, the gel characteristics show little improvement. More than 25 percent oil may be employed, but there is no further improvement in gel characteristics and the economic advantages of the process are reduced. It is preferred to employ 2 to 10 percent oil so that good gels are obtained and oil consumption is minimized.

The solution of chlorosilicon compound and oil is added to the aqueous medium which is agitated to facilitate the hydrolysis. The aqueous medium may consist of only water initially, in which case the hydrogen chloride formed by the hydrolysis dissolves in the water. When the water becomes saturated with the hydrogen chloride, gaseous hydrogen chloride will be evolved. The aqueous medium may contain hydrogen chloride or an inorganic chloride salt initially so that gaseous hydrogen chloride is evolved even at the start of the hydrolysis. Inorganic salts such as sodium chloride or calcium chloride may be employed. The term "aqueous" means that the medium contains essentially water as the component reacting with the chlorosilicon compounds and excludes such organic components as alcohols which are also reactive with chlorosilicon compounds. In a preferred embodiment of the invention, hydrogen chloride gas is recovered from the hydrolysis and the aqueous medium consists of concentrated hydrogen chloride solution. The amount of aqueous medium employed can be varied widely so long as sufficient water is employed to completely hydrolyze the chlorosilicon composition.

The hydrolysis may be carried out over a considerable temperature range from below room temperature up to about the boiling point of the combined aqueous medium chlorosilicon composition. The hydrolysis is endothermic when the aqueous medium is concentrated hydrogen chloride and heating may be employed to maintain the temperature. When the aqueous medium is only water the hydrolysis is exothermic and cooling may be employed to control the reaction.

As the hydrolysis progresses, granular siloxane gel particles separate from the aqueous medium. When the separation of gel particles ceases, the gel may be removed from the aqueous medium by any convenient manner such as filtration or centriguation. The gels thus obtained by the process of this invention are non-sticky and easily handleable in further processing steps, shipment or disposal operations.

The following examples are presented for illustrative purposes only and should not be construed as limiting the invention which is delineated in the claims.

EXAMPLE 1

The polyfunctional chlorosilicon composition employed in this hydrolysis was a high boiling (<165° C.) residue from the direct process production of methylchlorosilanes. The residue contained some suspended solids consisting mostly of silicon metal fines. The remaining residue is a complex mixture of polyfunctional chlorosilicon compounds some of which have not been identified. A few of the identified compounds are phenyltrichlorosilane, 1,1-dimethyl-1,3,3,3-tetrachlorodisilmethylene, 1,3-dimethyl-1,1,3,3-tetrachlorodisilmethylene, 1-methyl-1,1,3,3,3-pentachlorodisilmethylene and 1-methyl-1,1,4,4,4-pentachlorodisilethylene.

A first solution was prepared by dissolving 1.5 g. of grade #6 fuel oil in 28.5 g. of direct process residue and a second solution was prepared with 1.5 g. of SAE #30W lubricating oil with a viscosity of 295 cs. at 25° C. in 28.5 g. of direct process residue. A 15 g. portion of each solution was hydrolyzed by adding it with stirring to 75 ml. of concentrated hydrochloric acid. Hydrogen chloride was evolved as the chlorosilicon compounds hydrolyzed. Small, uniform gel particles that were dark colored because of the silicon fines separated from the solution. The gel particles did not coalesce or stick to the sides of the glass container with either solution. For comparison, a portion of the direct process residue was hydrozyed similarly without the added oils. The gel particles formed were larger (up to 12 mm in diameter) and non-uniform. Some of the gel particles adhered to the walls of the glass container.

EXAMPLE 2

The polyfunctional chlorosilicon composition employed in this hydrolysis was a mixture of by-products from the production of organochlorosilane monomers. The composition had an ash content of $SiO_2$ of 19.5 percent, a total chloride contnt of 36.6 percent and a hydrolyzable chloride content of 35.7 percent. The major components of the composition were $C_2$ to $C_5$ alkyltrichlorosilanes and phenyldichlorosilane. The composition also contained about 10 percent by weight organic compounds such as benzene, toluene, and chlorobenzene.

A solution of 0.75 g. of grade #6 fuel oil and 14.25 g. of the polyfunctional chlorosilicon composition was added with stirring to 75 ml. of distilled water. The chlorosilicon compounds hydrolyzed rapidly and uniform granular gel particles separated from the water. The gel particles did not coalesce or stick to the sides of the glass container.

EXAMPLE 3

A solution of 0.75 g. of grade #6 fuel oil and 14.25 g. of the polyfunctional chlorosilicon composition used in Example 2 was added with stirring to 75 ml. of concentrated hydrochloric acid. Hydrogen chloride was evolved as the chlorosilicon compounds hydrolyzed. Again uniform granular gel particles separated from the water. The gel particles did not coalesce or stick to the sides of the glass container.

EXAMPLE 4

Solutions of the polyfunctional chlorosilicon composition used in Example 2 container 25, 5 and 2 percent by weight of SAE #5W lubricating oil with a viscosity of 40 cs. at 25° C. were hydrolyzed by adding 10 ml. portions to 75 ml. of concentrated hydrochloric acid.

Hydrogen chloride was evolved from the stirred mixture as the hydrolysis progressed. Granular gel particles formed on the surface of the aqueous phase. The gel particles did not coalesce or stick to the sides of the glass container.

EXAMPLE 5

A solution of the polyfunctional chlorosilicon composition used in Example 2 containing 2 percent by weight of SAE #5W lubricating oil with a viscosity of 40 cs. at ~25° C. was added dropwise to 75 ml. of a 50 percent by weight solution of calcium chloride in water. The reaction was carried out in a flask with a side arm connected with tubing to a water trap. Hydrogen chloride was evolved as the hydrolysis occurred and collected in the water trap. Again granular gel particles were formed from the hydrolysis which did not coalesce or stick to the sides of the glass container.

EXAMPLE 6

A solution of 1.5 g. of kerosene with a viscosity of 2 centistokes at 25° C. and 28.5 g. of the polyfunctional chlorosilicon composition used in Example 2 was prepared. Half of the solution was hydrolyzed by adding it over a 30 second time period to 75 ml. of stirred concentrated hydrochloric acid. The chlorosilanes slowly hydrolyzed evolving hydrogen chloride and forming small granular gel particles on the surface of the concentrated hydrochloric acid. The gel particles showed only a slight tendency to adhere to the glass container surface.

The second half of the solution was hydrolyzed as above except that distilled water was used instead of the concentrated hydrochloric acid. The hydrolysis in this case was exothermic and much more rapid. The gel particles formed were similar in size to those formed above but tended to adhere to the glass container surface.

EXAMPLE 7

About 5 g. of silicon tetrachloride solution containing 5 percent by weight of SAE #30W lubricating oil was added to 100 ml. of stirred ice water. Finely divided precipitate was formed and settled to the bottom of the container. The precipitate did not stick to the walls of the container.

That which is claimed is:

1. A method of hydrolyzing a polyfunctional chlorosilicon composition comprising (a) forming a solution of 1 to 25 percent by weight of a hydrocarbon oil with a viscosity of at least 2 centistokes at 25° C. and 75 to 99 percent by weight of polyfunctional chlorosilicon composition (b) mixing the solution with an aqueous medium and (c) removing the hydrogen chloride and aqueous medium to obtain a nonsticky gel that is easily handleable in further processing steps, shipment or disposal operations.

2. The method of hydrolyzing polyfunctional chlorosilicon composition of claim 1 wherein the aqueous medium is selected from the group consisting of water, an aqueous calcium chloride solution and a concentrated hydrogen chloride solution.

3. The method of hydrolyzing a polyfunctional chlorosilicon composition of claim 1 wherein the solution contains 2 to 10 percent by weight of the hydrocarbon oil.

4. The method of hydrolyzing a polyfunctional chlorosilicon composition of claim 1 wherein the hydrocarbon oil has a viscosity of at least 40 centistokes at 25° C.

5. The method of hydrolyzing a polyfunctional chlorosilicon composition of claim 1 wherein the polyfunctional chlorosilicon composition is a by-product from the production of commercial organochlorosilane monomers.

6. The method of hydrolyzing a polyfunctional chlorosilicon composition of claim 5 wherein the by-product is obtained from the direct process production of methylchlorosilanes.

7. The method of hydrolyzing a polyfunctional chlorosilicon composition of claim 5 wherein the aqueous medium is a concentrated hydrogen chloride solution and hydrogen chloride gas is recovered.

* * * * *

UNITED STATES PATENT AND TRADEMARK OFFICE
CERTIFICATE OF CORRECTION

PATENT NO. : 4,221,691

DATED : February 16, 1979

INVENTOR(S) : Jack B. Danielson; Donald N. Ingebrigston

It is certified that error appears in the above-identified patent and that said Letters Patent are hereby corrected as shown below:

In Column 3, line 4; the word "byproduct" should read "by-product'

In Column 4, line 28; the word "hydrozyed" should read

-- hydrolyzed --.

Signed and Sealed this

Twenty-second Day of December 1981

[SEAL]

Attest:

Attesting Officer

GERALD J. MOSSINGHOFF

Commissioner of Patents and Trademarks